US012735934B2

(12) United States Patent
Wu et al.

(10) Patent No.: US 12,735,934 B2
(45) Date of Patent: Sep. 15, 2026

(54) DOOR OPERATOR SENSOR AND LOGIC FOR VERTICALLY STACKING PANEL DOOR SYSTEMS

(71) Applicant: CornellCookson, LLC, Mountain Top, PA (US)

(72) Inventors: Zhizhuo Wu, Tempe, AZ (US); James Janick, Shavertown, PA (US); Brandon Carl Smith, Wapwallopen, PA (US)

( * ) Notice: Subject to any disclaimer, the term of this patent is extended or adjusted under 35 U.S.C. 154(b) by 854 days.

(21) Appl. No.: 17/966,384

(22) Filed: Oct. 14, 2022

(65) Prior Publication Data

US 2024/0125165 A1 Apr. 18, 2024

(51) Int. Cl.

| | |
|---|---|
| ***E05F 15/70*** | (2015.01) |
| ***E05D 15/20*** | (2006.01) |
| ***E05D 15/22*** | (2006.01) |

(52) U.S. Cl.

CPC .............. *E05F 15/70* (2015.01); *E05D 15/20* (2013.01); *E05D 2015/225* (2013.01); *E05Y 2201/43* (2013.01); *E05Y 2201/684* (2013.01); *E05Y 2400/44* (2013.01); *E05Y 2400/45* (2013.01); *E05Y 2400/502* (2013.01); *E05Y 2900/106* (2013.01)

(58) Field of Classification Search

CPC .... E05F 15/70; E05D 15/20; E05D 2015/225; E05Y 2201/43; E05Y 2201/684; E05Y 2400/44; E05Y 2400/45; E05Y 2400/502; E05Y 2900/106; E05Y 2400/32; E05Y 2900/11

See application file for complete search history.

(56) References Cited

U.S. PATENT DOCUMENTS

| | | | | |
|---|---|---|---|---|
| 3,280,508 | A | 10/1966 | Dugger | |
| 4,666,303 | A | 5/1987 | Pryor | |
| 5,357,183 | A * | 10/1994 | Lin | E05F 15/73 318/266 |
| 6,315,355 | B1 * | 11/2001 | Lamm | B60J 7/0573 296/213 |
| 8,453,703 | B2 | 6/2013 | Talboys | |
| 10,204,466 | B1 * | 2/2019 | Rothmuller | E05F 15/43 |
| 2004/0168863 | A1 * | 9/2004 | Reynolds | B66B 13/143 187/316 |
| 2019/0316399 | A1 * | 10/2019 | Sauve | E05F 15/681 |
| 2020/0355023 | A1 * | 11/2020 | Fazio | E05F 1/08 |
| 2022/0170303 | A1 | 6/2022 | Janick et al. | |
| 2025/0002296 | A1 * | 1/2025 | Talonen | G01B 7/003 |

OTHER PUBLICATIONS

International Search Report and Written Opinion mailed in corresponding PCT Application No. PCT/US2022/046770 on Jan. 30, 2023, 7 pages.

* cited by examiner

*Primary Examiner* — Shawn Decenzo

(57) ABSTRACT

In example implementations, a vertically stacking panel door system is provided. The vertically stacking panel door system includes a horizontal door guide, a panel interface zone, a vertical door guide, a plurality of panels to move from a horizontally stacked position in the horizontal door guide to a vertically stacked position in the vertical door guide, a counterbalance system comprising a motor to move the plurality of panels, and a sensor to detect a gap between two adjacent panels of the plurality of panels as the plurality of panels are moved from the horizontally stacked position to the vertically stacked position, wherein the sensor is to transmit a signal to the motor when the gap is detected.

20 Claims, 5 Drawing Sheets

DOOR OPERATOR SENSOR AND LOGIC FOR VERTICALLY STACKING PANEL DOOR SYSTEMS

BACKGROUND

Overhead doors can be used for a variety of applications. For example, overhead doors can be used as garage doors in residential locations or as doors for bays and entrances to warehouses, retail stores, and restaurants in commercial locations.

Some overhead doors may be pulled open through a counterbalance system that includes a motor, a torsion spring, a rotating shaft connected to the motor and torsion spring, and a cable/strap system that connects the bottom section of a door to the rotating shaft. Other types of overhead doors can be operated using a non-spring mechanism. A door contains multiple sections that attach to adjacent sections with hinges. Through the movement of the counterbalance system, the door moves along a track. Typically, the moving door can be moved along the track, as the sections of the door are connected by hinges, to lay horizontally with the floor along the track. If a door has door sections that are connected by hinges to assist in moving the sections along the track, then the design of the counterbalance system and the track are sufficient to open and close the door.

DETAILED DESCRIPTION

There is a desire to have doors which can act as both a way to enter and exit a space, but also as a decorative, movable wall structure. These types of doors must be visually appealing and also take up minimal space when retracted into an open position. One approach to such a need is to provide a door where the door sections are maintained and stored in a vertical orientation, or a vertically stacking panel door system.

The vertically stacking panel door system may comprise door panels that do not utilize hinges between the door panels. Further, the vertically stacking panel door system may not utilize a counterbalance system with a torsion spring. Examples described herein provide examples of a door operator sensor and logic for vertically stacking panel door systems. With the vertical stacking of the panels in a horizontal track guide when the door is in an open position, a closing event of the door requires more than the movement of the bottom most panel of the door. The subsequent panels require gravitational forces as well as momentum to complete the closing event of the door.

However, since the vertically stacking panel door is formed by individual panels, there may be potential for gaps to form between the panels as the door is closed. For example, closing the door in a vertically stacking panel door system requires each panel to move from a horizontal track guide to a vertically stacked position along a vertical track guide as the panels remain in a substantially vertical orientation.

Each panel may be moved one panel at a time from the horizontal track guide to the vertical track guide. Only the bottom most panel is connected to a cable/strap which provides the forces needed to start an opening or closing event of the door. The remainder of the door panels require gravitational forces and momentum during a closing event to move. As each panel transitions from the horizontal track guide to the vertical track guide, there is a potential for a panel to get stuck in the horizontal track guide or a panel interface zone while a previous panel moves further down the vertical track guide. This separation between panels may prevent the upper panels of the door from moving during a closing event.

It may be undesirable to have a gap between panels for proper operation of the vertically stacking panel door system. The present disclosure provides a sensor (e.g., either electrical, mechanical, or a combination of an electrical and mechanical sensor) to detect when a gap is formed between panels in the panel interface zone. When an undesired gap between panels is detected, the sensor may automatically transmit a signal to a motor of the door to stop operation of the motor. Thus, the panels can be adjusted to eliminate the gap safely and resume operation of the door.

Figure 1:
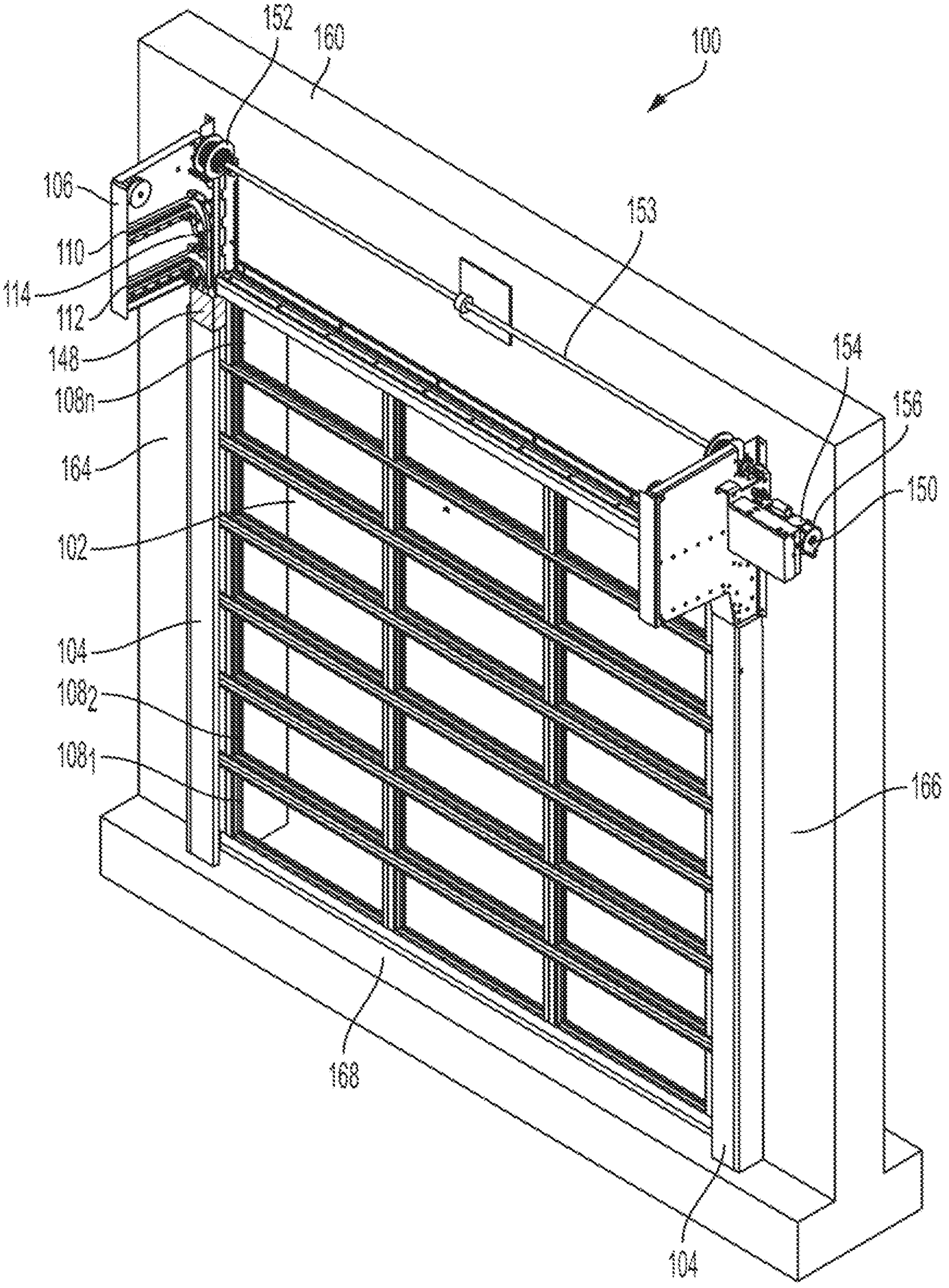
FIG. 1 illustrates an isometric view of an example of the vertically stacking panel door of the present disclosure.

FIG. 1 illustrates an isometric view of an example vertically stacking panel door system 100 of the present disclosure. The vertically stacking panel door system 100 may include a door 102 that is comprised of a plurality of vertically stacking disconnected panels $\mathbf{108}_1$ to $\mathbf{108}_n$ (hereinafter also referred to individually as a panel 108 or collectively as panels 108). The door 102 may be opened by moving the panels 108 vertically along a track or track system. The track system may include different track portions that define a path along which the panels 108 may move to open and close the door 102.

In one embodiment, the track may include opposing vertical track guides 104, a horizontal track guide 106, and a panel interface zone 114. The horizontal track guide 106 includes a first horizontal track portion 110 (also referred to herein as an upper horizontal track 110) and a second horizontal track portion 112 (also referred to herein as a lower horizontal track 112). The opposing vertical track guides 104 may include a first vertical track 104 on a first side of a guide cover 164 and a second vertical track 104 on a second side of a guide cover 166. The guide covers 164 and 166 may be flush with the opening in the building structure (wall) or may be adjacent to the opening in the building structure (wall).

The panel interface zone 114 defines a transitional area between the vertical door guide 104 and the horizontal door guide 106. The panel interface zone 114 proves the means for guiding the panels 108 during an opening or closing event, such as lifting and separating the plurality of panels 108 when the door 102 is opening and aligning and placing the plurality of panels 108 in tangential connection when the door 102 is closing. As the panels 108 are separated, the panels 108 can be stacked along the horizontal track guide 106. As the panels 108 are aligned and tangentially connected, the panels 108 can be stacked in a vertical orientation along the opposing vertical track guides 104.

In one embodiment, the door 102 may be closed by moving the panels 108 towards the vertical door guide 104. Mechanical assistance is provided to the bottom most panel $108_1$ of the door 102 and the remainder of the panels $108_n$ move by gravitational forces and momentum. The panels 108 may be stacked on top of one another as the door 102 is closed.

In one embodiment, the vertically stacking panel door system 100 may include a counterbalance system 154. The counterbalance system 154 may include a drum 152, a barrel 153, and a motor 156. The counterbalance system 154 may also include a strap/cable (not shown) that is coupled to the drum 152 and the bottom most panel 108 (e.g., panel $108_1$ in FIG. 1). The drum 152 may be coupled to the motor 156 and powered by the motor 156 or may be manually operated to rotate. The counterbalance system 154 may further comprise a torsion spring (not shown). When the drum 152 is operated to open the door 102, the drum 152 may pull the bottom most panel 108 up with the torsion spring providing forces to assist in the pull. When the drum 152 is operated to close the door 102, the drum 152 may rotate in an opposite direction to allow the bottom most panel 108 to descend through the panel interface zone 114 and down the opposing vertical track guides 104 into a closed position. If a torsion spring is present, when the drum 152 is operated to close the door 102, the drum 152 may rotate in an opposite direction to apply tension to the torsion spring and to allow the bottom most panel 108 to descend through the panel interface zone 114 and down the opposing vertical track guides 104 into a closed position.

Figure 3:
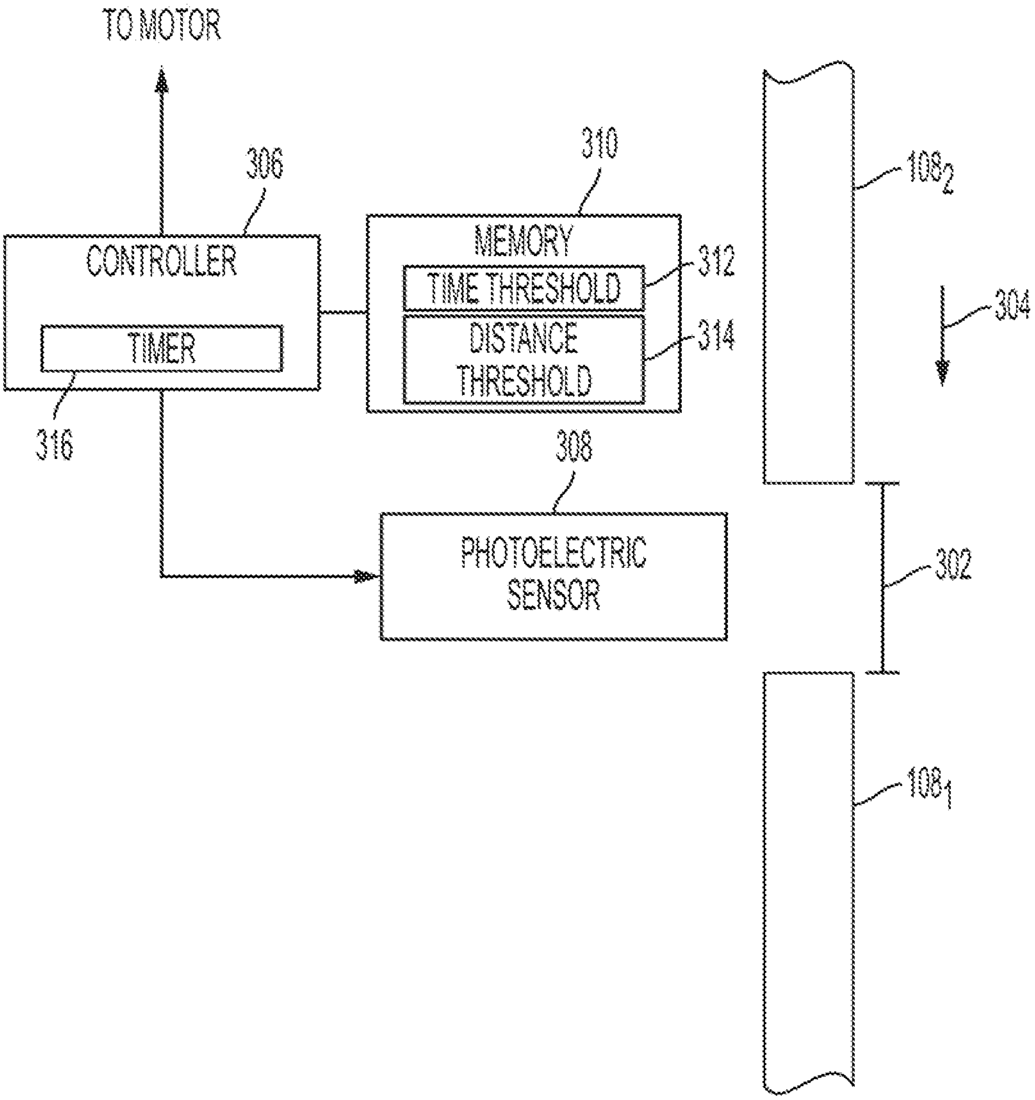
FIG. 3 is a block diagram of an electronic sensor to detect a gap and stop a closing operation of a door.
Figure 4:
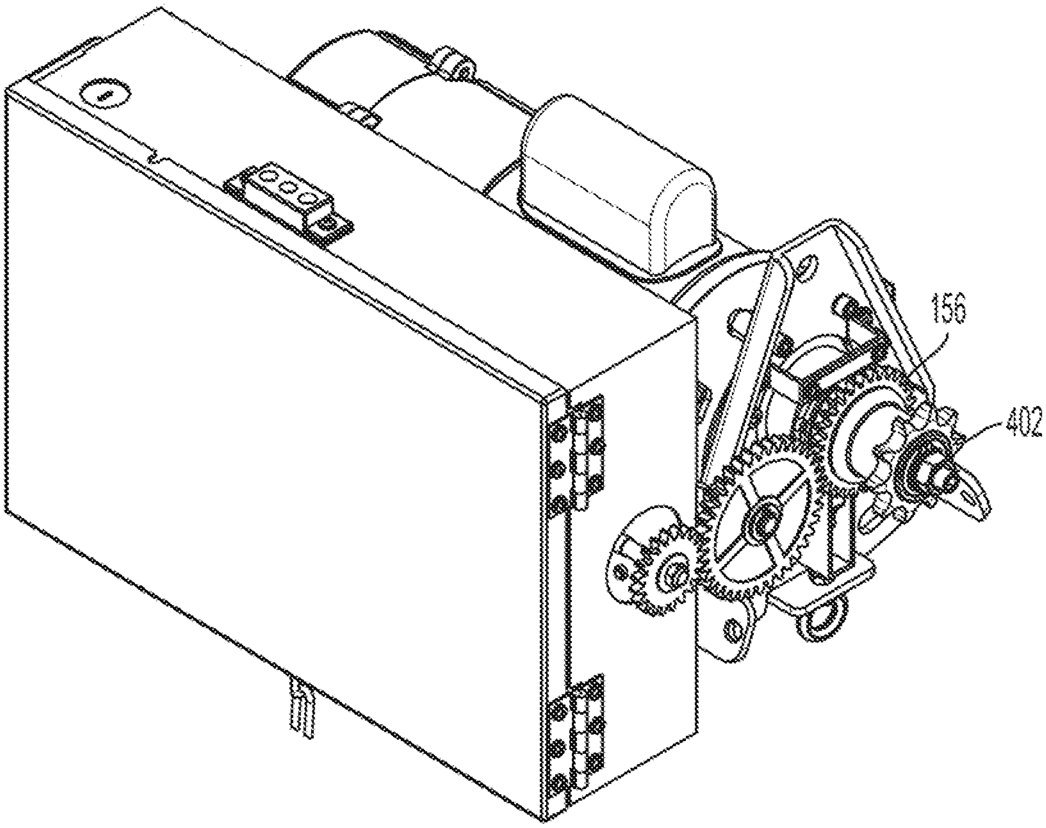
FIG. 4 is an illustration of an example physical sensor to detect a gap and stop a closing operation of the door.

In one embodiment, the vertically stacking panel door system 100 may include one or more sensors 148 and 150. The sensor 148 may be an electronic sensor, and the sensor 150 may be a mechanical sensor. Details of the sensors 148 and 150 are illustrated in FIGS. 3 and 4 and described in further detail below.

In one embodiment, the vertically stacking panel door system 100 may be deployed with only the sensor 150 or with both the sensor 148 and the sensor 150. The sensors 148 and 150 may be used to detect a gap between panels 108 when the door 102 is closing in the panel interface zone 114. The sensors 148 and 150 may be located within, near, or adjacent to the panel interface zone 114. For example, the sensor 148 may be located near the bottom of the panel interface zone 114 and near the counterbalance system 154. The sensor 150 may be located as part of the motor 156 of the counterbalance system 154.

The sensors 148 and 150 may generate a signal to an electrical operator (e.g., a processing system that controls the motor and/or operation of the counterbalance system 154) to stop the closing operation of the door 102 when an undesired gap is detected. Thus, damage to the door 102 may be prevented.

Figure 2:
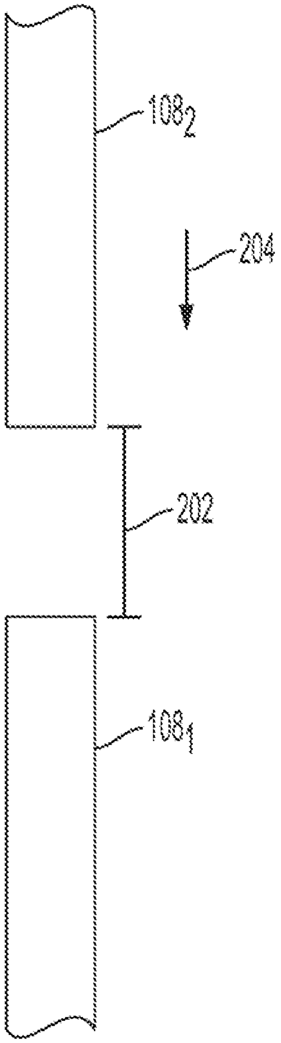
FIG. 2 is a block diagram of an example of a gap formed between panels while the panel door is closing.

FIG. 2 illustrates an example of an undesired gap 202 that can be formed between adjacent panels 108 during a closing operation. In one embodiment, the closing operation may cause the panels 108 to move downward into the vertical track guides 104 in a direction shown by an arrow 204.

FIG. 2 illustrates the gap 202 formed between adjacent panels $108_1$ and $108_2$. For example, during the closing operation, the panel $108_1$ may continue to move downward, but the panel $108_2$ may fail to progress out of the horizontal track guide, get stuck in the panel interface zone 114, or get stuck in the horizontal track guide 106. Thus, as the panel $108_1$ continues to move downward in the vertical track 104, the gap 202 may be formed between the panels $108_1$ and $108_2$.

It should be noted that the gap 202 may be defined as a distance that is larger than a predefined threshold between adjacent panels 108. In other words, the gap 202 may be detected whenever a sensor parameter is greater than a threshold that is measured by the sensors 148 and 150 to detect the gap.

For example, the sensor 148 may measure a distance between adjacent panels 108 based on detection of light. In one embodiment, the gap 202 may be defined as a distance that is larger than a predefined threshold between adjacent panels 108 for a predefined amount of time. For example, the sensor 148 may account for the presence of gaps between adjacent panels 108 temporarily as each panel 108 transitions between the panel interface zone 114 and the vertical track guides 104. Thus, a timer or predefined time threshold may be used. If the timer expires or the time threshold is exceeded, the sensor 148 may detect that the gap 202 is present.

In an example, the sensor 150 may measure an amount of torque applied to the motor 156. The amount of torque may be translated to detection of a potential gap. When the amount of torque measured by the sensor 150 is greater than a threshold, the sensor 150 may detect a gap between adjacent panels.

FIG. 3 illustrates a block diagram of an example of the sensor 148 that is an electric sensor. The sensor 148 may be located within, near, or adjacent to the panel interface zone 114 and adjacent to, and immediately below, the counterbalance system 154. The electric sensor may be any type of electric sensor. For example, the electric sensor may be a photoelectric sensor, an induction sensor, and the like.

In FIG. 3, the electric sensor may be a photoelectric sensor 308 that detects light. The photoelectric sensor 308 may be positioned such that the sensor is aimed at the ends of the panels 108 between the panel interface zone 114 and the vertical track guides 104.

Although a photoelectric sensor 308 is illustrated in FIG. 3 as an example of an electric sensor, it should be noted that other types of electric sensors may be used. For example, other types of electric sensors may use laser, infrared light, magnetic fields, and the like to detect the undesired gaps between adjacent panels 108.

In one embodiment, when a panel 108 moves in front of the photoelectric sensor 308, the panel 108 may block the sensor 308. In other words, the photoelectric sensor 308 would detect no light. When no panel 108 is located in front of the photoelectric sensor 308, the photoelectric sensor 308 would detect light and therefore detect a gap 302. In other words, the photoelectric sensor 308 may detect a gap 302 when a space (which allows light to be detected by the photoelectric sensor 308) is detected between adjacent panels 108.

In one embodiment, the photoelectric sensor 308 may measure a size of the gap 302 based on an estimated velocity of the panels 108 and an amount of time elapsed between when the photoelectric sensor 308 detects light and when the photoelectric sensor 308 does not detect light (e.g., the adjacent panel 108 blocks the sensor 308).

The electric sensor may also include a controller 306 and a memory 310. The controller 306 may be a processor or an application specific integrated circuit (ASIC) programmed to perform specific functions. The memory 310 may be any type of non-transitory computer readable medium that can store instructions that are executed by the controller 306. The memory 310 may be a hard disk drive, a solid state drive, a peripheral component interconnect express (PCIe) memory, a random access memory (RAM), a read only memory (ROM), and the like.

In one embodiment, the controller 306 may be communicatively coupled to the memory 310 and the photoelectric sensor 308. The controller 306 may receive the measurements from the photoelectric sensor 308. For example, the controller 306 may receive signals from the photoelectric sensor 308 whenever a light is detected and whenever the light is no longer detected. The controller 306 may use an internal clock to associate each signal with a time stamp. Based on the known velocity of the panels, the controller 306 may calculate the distance (size) of the gap 302.

In one embodiment, the controller 306 may compare the distance or size of the gap 302 to a predefined distance threshold 314 stored in the memory 310. The predefined distance threshold 314 may be defined by an installer of the vertically stacking door system 100. For example, the predefined distance threshold 314 may be set to 10 centimeters, 100 centimeters, or any other desired size. If the size of the gap 302 calculated by the controller 306 is larger than the distance threshold 314, the controller 306 may send a signal to the motor 156 or the operator to stop the closing operation of the door 102.

In one embodiment, the controller 306 may detect the gap 302 based on the calculated size of the gap 302 and a time component. For example, the memory 312 may have a time threshold 312 or a timer 316 may be used. If the size of the gap 302 is measured to be greater than the distance threshold 314 and the gap 302 is detected for an amount of time greater than the time threshold 312 or past expiration of the timer 316, then the controller 306 may determine that the gap 302 is detected. The controller 306 may transmit a signal to the motor 156 of the operator to stop the closing operation of the door 102.

FIG. 4 illustrates an example of the sensor 150 that is a physical or mechanical sensor. Although FIG. 4 illustrates an example mechanical sensor that measures torque or force, it should be noted that any type of mechanical sensor can be used. For example, the mechanical sensor may measure pressure or a position that can sense a torque direction.

In one embodiment, the mechanical sensor may be an adjustable drive sprocket 402 coupled to the motor 156. The adjustable drive sprocket 402 may be set to a particular level of force (or dynamic torque) to turn the motor 156. When the particular level of torque is reached on the motor 156, the adjustable drive sprocket 402 may cause the motor 156 to stop operating. For example, a gear can be released to block rotation of gears on the motor 156 that rotate the drum 152 that would otherwise cause the door 102 to close.

The level of torque can be translated into a size of a gap between panels 108. For example, as the gap between two panels 108 grows larger, the anticipated weight upon the bottom most panel 108$_1$ of the door 102 is less than anticipated, which means there is less weight working against a torsion spring in the counterbalance system 154 and less torque from the motor 156. As a result, the torque may increase as the motor 156 works harder against the spring in the counterbalance system 154. The amount of torque may increase in a linear relationship to the size of the gap between panels 108.

In an example, the adjustable drive sprocket 402 may be set to a torque that is greater than an amount of torque required to move the first panel 108$_1$ out of the horizontal track guide 106. The amount of torque required to move the first panel 108$_1$ may be the greatest compared to all other panels 108$_2$ to 108$_n$. Thus, if any panel 108$_2$ to 108$_n$ were to get stuck, the amount of torque would be greater than the amount of torque required to move the first panel 108$_1$. The increase in torque would be detected by the adjustable drive sprocket 402, causing the motor 156 to stop operating.

In one embodiment, both the photoelectric electric sensor 308 and the adjustable drive sprocket 402 may be deployed to detect the gap 202 or 302 between adjacent panels 108. For example, a scenario may exist where a panel 108 gets stuck in front of the photoelectric sensor 308. As a result, without the adjustable drive sprocket 402, the operator may try to continue closing the door 102. This may cause damage to the panels 108 or create a large gap that is undesirable.

However, the adjustable drive sprocket 402 may detect an increase in torque as the size of the gap 202 or 302 continues to grow between adjacent panels 108. Thus, even though the photoelectric sensor 308 does not detect the gap 202 or 302, the adjustable drive sprocket 402 may detect the gap 202 or 302 due to the increase in torque. Thus, although the photoelectric sensor 308 and the adjustable drive sprocket 402 working alone can detect the gap 202 or 302 in most scenarios, the combination of both the photoelectric sensor 308 and the adjustable drive sprocket 402 may detect the gap 202 or 302 in all scenarios.

Figure 5:
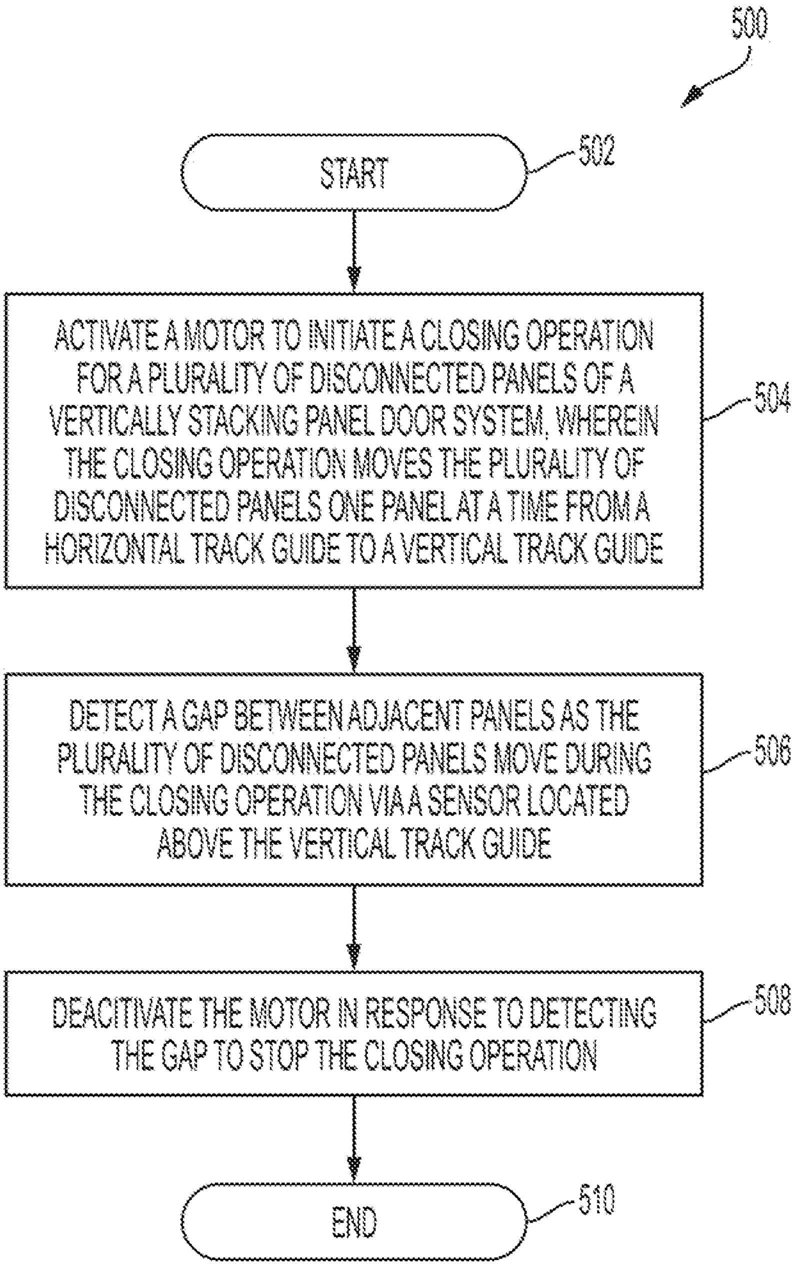
FIG. 5 is a flow chart of a method for detecting a gap between panels of a vertically stacking panel door to stop a closing operation of the present disclosure.

FIG. 5 illustrates a flow chart of an example method 500 for detecting a gap between panels of a vertically stacking panel door to stop a closing operation. The method 500 may be performed by the vertically stacking panel door system 100 illustrated in FIG. 1. For example, the method 500 may be performed by an operator of a counterbalance system 154 in combination with the sensor 148 and/or the sensor 150 or by the controller 306 illustrated in FIG. 3.

At block 502, the method 500 begins. At block 504, the method 500 activates a motor to initiate a closing operation for a plurality of disconnected panels of a vertically stacking panel door system, wherein the closing operation moves the plurality of disconnected panels one panel at a time from a horizontal track guide to a vertical track guide. For example, the bottom most panel may leave the horizontal track guide first, followed by subsequent panels of the door. The panels may travel from a horizontal track guide, through a panel interface zone where the panels transition from horizontal movement to vertical movement, and then into the vertical track guide.

At block 506, the method 500 detects a gap between adjacent panels as the plurality of disconnected panels moves during the closing operation via a sensor located above the vertical track guide. As discussed above, occasionally a panel may get stuck during the closing operation. The panels below the stuck panel may continue to move vertically downward, creating a gap between the panel that is moving downward in the vertical track guide and the panel that is stuck in the horizontal track guide or panel interface zone.

In one embodiment, the sensor may be an electrical sensor or a physical/mechanical sensor. In one embodiment, both the electrical sensor and the physical sensor may be used in combination to detect the gap between adjacent panels. The sensor may detect the gap based on a parameter that is measured by the sensor.

For example, the electrical sensor may be a photoelectric sensor. The photoelectric sensor may detect light between the panels. A gap may be detected based on a size of the gap measured by the photoelectric sensor or based on an amount of time for which the gap is detected by the photoelectric sensor.

For example, the size of the gap may be calculated based on the light signals detected between panels by the photoelectric signal. A distance can be calculated between the adjacent panels based on an amount of time for which the light is detected between the adjacent panels and an estimated speed at which the adjacent panels are travelling past the photoelectric sensor. The distance, or size of the gap, can be compared to a predefined distance threshold. The threshold can be set to what may be considered as an acceptable gap size (e.g., 10 centimeters, 15 centimeters, 30 centimeters, and the like). When the distance between panels is greater than the predefined distance threshold, a gap may be detected.

In another example, the photoelectric sensor may detect the gap based on how long the light signal between adjacent panels is detected. When the light is detected, a controller communicatively coupled to the photoelectric sensor may start a timer or begin tracking an amount of time that has passed. When the timer expires, or when the amount of time that has passed exceeds a time threshold, without interruption to the light that is detected, the controller may determine that a gap is detected.

In other words, if another panel were to pass in front of the photoelectric sensor, the light signal would be interrupted. The panel would block the light detected by the photoelectric sensor. Thus, the timer would reset, or the controller would reset the amount of time that has passed to zero. After the panel passes the photoelectric sensor, the photoelectric sensor would detect light again, and the timer or time tracking would begin again. The process may repeat until the last panel reaches the vertical track guide and the closing operation is completed.

In one embodiment, the sensor may be a physical or mechanical sensor, such as a torque sensor. The torque sensor may have an adjustable drive sprocket that can be set to a desired torque level. The desired torque level can be associated with a desired gap size or distance between the adjacent panels. For example, the increase in gap size may have a linear relationship with the increase in torque caused by the increase in gap size. The torque sensor may detect the gap when the amount of torque on the motor is greater than a torque setting on the adjustable drive sprocket.

In one embodiment, both the photoelectric sensor and the torque sensor may be used to detect the gap. For example, there may be an instance where a panel gets stuck, or stops, in front of the photoelectric sensor. Thus, the photoelectric sensor may not detect light and may therefore determine that no gap exists. However, the torque sensor may detect an increase in torque due to the panel that is stuck. As a result, the torque sensor may provide redundant or additional gap detection in combination with the photoelectric sensor.

At block 508, the method 500 deactivates the motor in response to detecting the gap to stop the closing operation. For example, the controller communicatively coupled to the photoelectric sensor may also be communicatively coupled to an operator or coupled directly to the motor. When the controller detects the gap based on the signals measured by the photoelectric sensor, the controller may send a signal to deactivate the motor.

In one embodiment, the torque sensor may stop the motor when the amount of torque is greater than the torque setting on the adjustable drive sprocket. The torque sensor may engage a gear that stops rotation of the motor mechanically to stop the motor and pause the closing operation of the door.

A technician may fix the panel that is stuck and reset the motor to complete the closing operation. At block 510, the method 500 ends.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A vertically stacking panel door system, comprising:
a horizontal door guide;
a panel interface zone;
a vertical door guide;
a plurality of panels to move from a horizontally stacked position in the horizontal door guide to a vertically stacked position in the vertical door guide; and
a sensor to detect a gap between two adjacent panels of the plurality of panels as the plurality of panels is moved during an opening operation or a closing operation, wherein the sensor is to transmit a signal to a motor when the gap is detected.

2. The vertically stacking panel door system of claim 1, further comprising:
a counter balance system, wherein the sensor is located adjacent to the counterbalance system.

3. The vertically stacking panel door system of claim 1, wherein the sensor comprises an electrical sensor.

4. The vertically stacking panel door system of claim 3, wherein the electric sensor comprises a photoelectric sensor or an induction sensor.

5. The vertically stacking panel door system of claim 4, wherein the photoelectric sensor is to detect the gap when a space between the two adjacent panels is greater than a predefined distance.

6. The vertically stacking panel door system of claim 4, wherein the photoelectric sensor is to detect the gap when a space is detected between the two adjacent panels after a timer expires.

7. The vertically stacking panel door system of claim 1, wherein the sensor comprises a mechanical sensor.

8. The vertically stacking panel door system of claim 7, wherein the mechanical sensor comprises a torque sensor comprising an adjustable drive sprocket coupled to the motor, a pressure sensor, or a position sensor to detect a torque direction.

9. The vertically stacking panel door system of claim 1, wherein the sensor comprises a combination of an electrical sensor and a mechanical sensor.

10. The vertically stacking panel door system of claim 9, wherein the electrical sensor comprises a photoelectric sensor and the mechanical sensor comprises a torque sensor.

11. A method, comprising:
activating a motor to initiate a closing operation for a plurality of disconnected panels of a vertically stacking panel door system, wherein the closing operation moves the plurality of disconnected panels one panel at a time from a horizontal track guide to a vertical track guide;
detecting a gap between adjacent panels of the plurality of disconnected panels as the plurality of disconnected panels moves during the closing operation via a sensor located above the vertical track guide; and
deactivating the motor in response to detecting the gap to stop the closing operation.

12. The method of claim 11, wherein the sensor comprises a photoelectric sensor, and the detecting the gap between the adjacent panels comprises:
detecting light after a first panel of the plurality of disconnected panels passes by the photoelectric sensor;
starting a timer; and
detecting that the timer has expired without interruption to the light that is detected.

13. The method of claim 11, wherein the sensor comprises a photoelectric sensor, and the detecting the gap between the adjacent panels comprises:

calculating a distance between the adjacent panels based on an amount of time for which a light is detected between the adjacent panels and an estimated speed at which the adjacent panels are traveling past the photoelectric sensor;

comparing the distance to a predefined distance threshold; and detecting the gap when the distance is greater than the predefined distance threshold.

14. The method of claim 11, wherein the sensor comprises a torque sensor with an adjustable drive sprocket, and the detecting the gap between the adjacent panels comprises:

detecting that an amount of torque on the motor is greater than a torque setting on the adjustable drive sprocket.

15. The method of claim 11, wherein the sensor comprises a photoelectric sensor and a torque sensor with an adjustable drive sprocket, and the detecting the gap between the adjacent panels comprises:

detecting that an amount of torque on the motor is greater than a torque setting on the adjustable drive sprocket while one of the adjacent panels is stopped in front of the photoelectric sensor.

16. A vertically stacking panel door system, comprising:

a horizontal door guide;

a panel interface zone;

a vertical door guide;

a plurality of panels to move from a horizontally stacked position in the horizontal door guide to a vertically stacked position in the vertical door guide;

a counterbalance system comprising a motor to move the plurality of panels;

a photoelectric sensor to detect a gap between two adjacent panels of the plurality of panels as the plurality of panels is moved from the horizontally stacked position to the vertically stacked position; and a mechanical sensor to detect that an amount of torque on the motor has exceeded a torque threshold, wherein the motor is deactivated in response to the gap being detected by the photoelectric sensor or in response to a mechanical gear activated by the amount of torque exceeding the torque threshold.

17. The vertically stacking panel door system of claim 16, wherein the photoelectric sensor is to transmit an electrical signal to an operator to cause the operator to deactivate the motor.

18. The vertically stacking panel door system of claim 16, wherein the torque threshold is set by an adjustable drive sprocket.

19. The vertically stacking panel door system of claim 16, wherein the photoelectric sensor detects the gap when a size of the gap is greater than a predefined size threshold.

20. The vertically stacking panel door system of claim 16, wherein the photoelectric sensor detects the gap when light is detected continuously until a timer expires.

* * * * *